United States Patent [19]
Shimizu

[11] Patent Number: 6,031,546
[45] Date of Patent: *Feb. 29, 2000

[54] IMAGE PROCESSING APPARATUS AND METHOD

[75] Inventor: Hideaki Shimizu, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/666,681

[22] Filed: Jun. 18, 1996

[30] Foreign Application Priority Data

Jun. 19, 1995 [JP] Japan ........................... 7-175462

[51] Int. Cl.$^7$ ......................................... G06F 15/00

[52] U.S. Cl. ............................................. 345/437

[58] Field of Search ...................... 345/433, 437, 345/438, 439, 121, 126

[56] References Cited

U.S. PATENT DOCUMENTS

| | | | |
|---|---|---|---|
| 4,747,154 | 5/1988 | Suzuki et al. | 345/439 |
| 4,893,258 | 1/1990 | Sakuragi | 364/521 |
| 5,043,714 | 8/1991 | Pearlman | 345/196 |
| 5,159,666 | 10/1992 | Fukuda et al. | 395/139 |

*Primary Examiner*—Phu K. Nguyen
*Attorney, Agent, or Firm*—Fitzpatrick, Cella, Harper & Scinto

[57] ABSTRACT

In continuously writing image data transferred from an image plane spreading two-dimensionally in a memory plane spreading two-dimensionally, or continuously reading out image data from the memory plane, a first address for accessing image data of a predetermined unit block in the image plane is converted into a second address. The image data of the unit block is stored as one-row image data in a one-row storage area of the memory plane which is designated by the second address. Predetermined image processing of the image data corresponding to the unit block is performed by reading out the image data from the one-row storage area in the row direction in the memory plane.

28 Claims, 10 Drawing Sheets

FIG. 10

| COUNTER 1 | COOUNTER 2 | BLOCK TYPE | PROCESSING |
|---|---|---|---|
| H, U | V, U | a | NORMAL IMAGE |
| V, U | H, D | b | 90°-ROTATION |
| H, D | V, D | c | 180°-ROTATION |
| V, D | H, U | d | 270°-ROTATION |
| H, D | V, U | a' | MIRRORING IN HORIZONTAL DIRECTION |
| V, D | H, D | b' | MIRRORING IN HORIZONTAL DIRECTION AFTER 90°-ROTATION |
| H, U | V, D | c' | MIRRORING IN VERTICAL DIRECTION |
| V, U | H, U | d' | MIRRORING IN HORIZONTAL DIRECTION AFTER 270°-ROTATION |

IMAGE PROCESSING APPARATUS AND METHOD

BACKGROUND OF THE INVENTION

1. Field of the Invention

The present invention relates to an image processing apparatus and method which are capable of storing, for example, two-dimensional image data, and performing rotation processing, mirroring, or the like on the stored image data at a high speed.

2. Background of the Invention

In recent years, with increases in the resolution of image data and the processing speed of an apparatus for processing image data, the transfer rate of image data in an image data processing apparatus has rapidly increased. On the other hand, an image memory used to retain and edit image data has been indispensable for the processing apparatus. In this situation, it may be difficult to increase the write/read rates of data with respect to a memory so that the rates are equal to transfer rates of the image data. In order to realize such high write/read rates, high-speed memory access is required.

In order to realize high-speed access to a memory, various functions have been devised for the memory device and put into practice.

A conventional access speed is not sufficient for edition and processing of image data, e.g., rotation or mirroring of stored image data. A memory device generally has a memory plane as a two-dimensional space. In case of editing and processing image data, control to write and read successive image data in/from the memory plane from arbitrary directions must be continuously performed. In a memory device capable of high-speed access, the continuous access in the row direction has been performed at a very high speed. However, owing to the structure of the memory device, it is difficult to greatly increase the speed of continuous access in the column direction. For this reason, high-speed, and continuous control to write/read data in/from the memory plane from arbitrary directions cannot be performed.

SUMMARY OF THE INVENTION

The present invention has been made in consideration of the above problem, and has as its object to provide an image processing apparatus and method which can perform high-speed edition and processing of image data, e.g., rotation or mirroring of stored image data, by performing continuous control to write/read data in/from a memory plane from arbitrary directions, regardless of a direction of inputting the image.

In order to achieve the above object, according to the present invention, there is provided an image processing apparatus for writing image data which is spreading two-dimensionally, in storage means and reading out the image data from the storage means, comprising setting means for setting address so as to store image data of a predetermined unit block as one-row image data in the storage means, and means for storing the one-row image data in a one-row storage area of the storage means which is designated by the address set by said setting means.

According to another aspect of the present invention, there is provided an image processing method of writing image data which is spreading two-dimensionally, in storage means and reading out the image data from the storage mean, comprising a step of setting address so as to store image data of a predetermined unit block as one-row image data in the storage means, and a step of storing the one-row image data in a one-row storage area of the storage means which is designated by the address set in said setting step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a view showing an address control table for rotation processing and mirroring.

DETAILED DESCRIPTION OF THE PREFERRED EMBODIMENT

An embodiment of the present invention will be described below with reference to the accompanying drawings.

Figure 1:
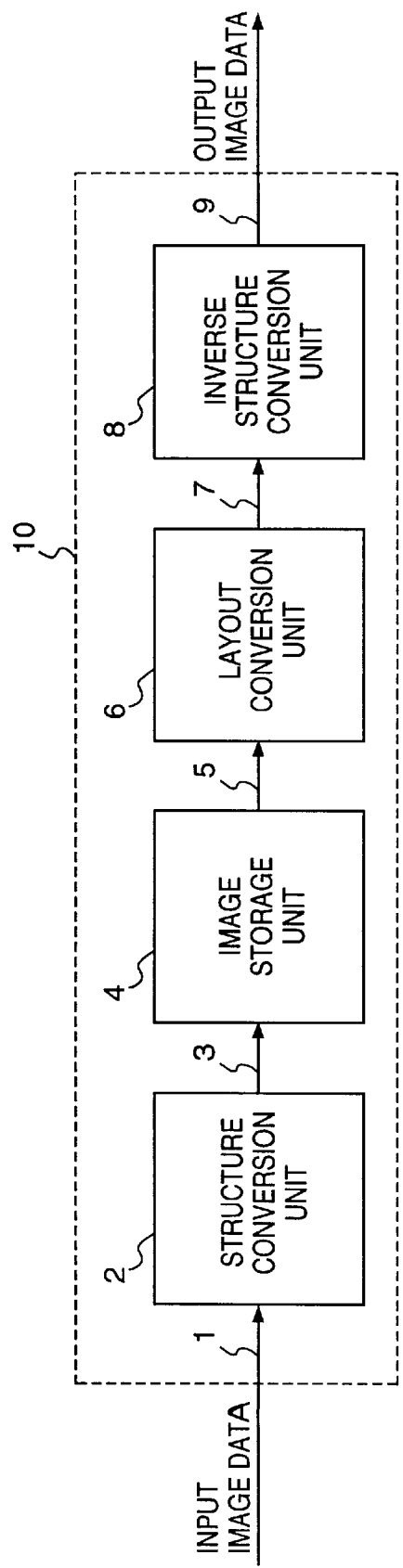
FIG. 1 is a block diagram showing the arrangement of the main part of an image data storage apparatus according to an embodiment of the present invention.

FIG. 1 is a block diagram showing the arrangement of the main part of an image data storage apparatus according to an embodiment of the present invention. This image data storage apparatus includes a structure conversion unit 2 for converting the structure of image data (to be described later), an image storage unit 4 for storing image data, a layout conversion unit 6 for performing rotation processing/mirroring of image data, and an inverse structure conversion unit 8 for converting an image transfer structure into an original two-dimensional structure.

Referring to FIG. 1, reference numeral 1 denotes image data input from an external device such as a document reader, a personal computer or the like (not shown) to this apparatus. In this case, digital image data is transferred by the raster scheme.

Figure 2:
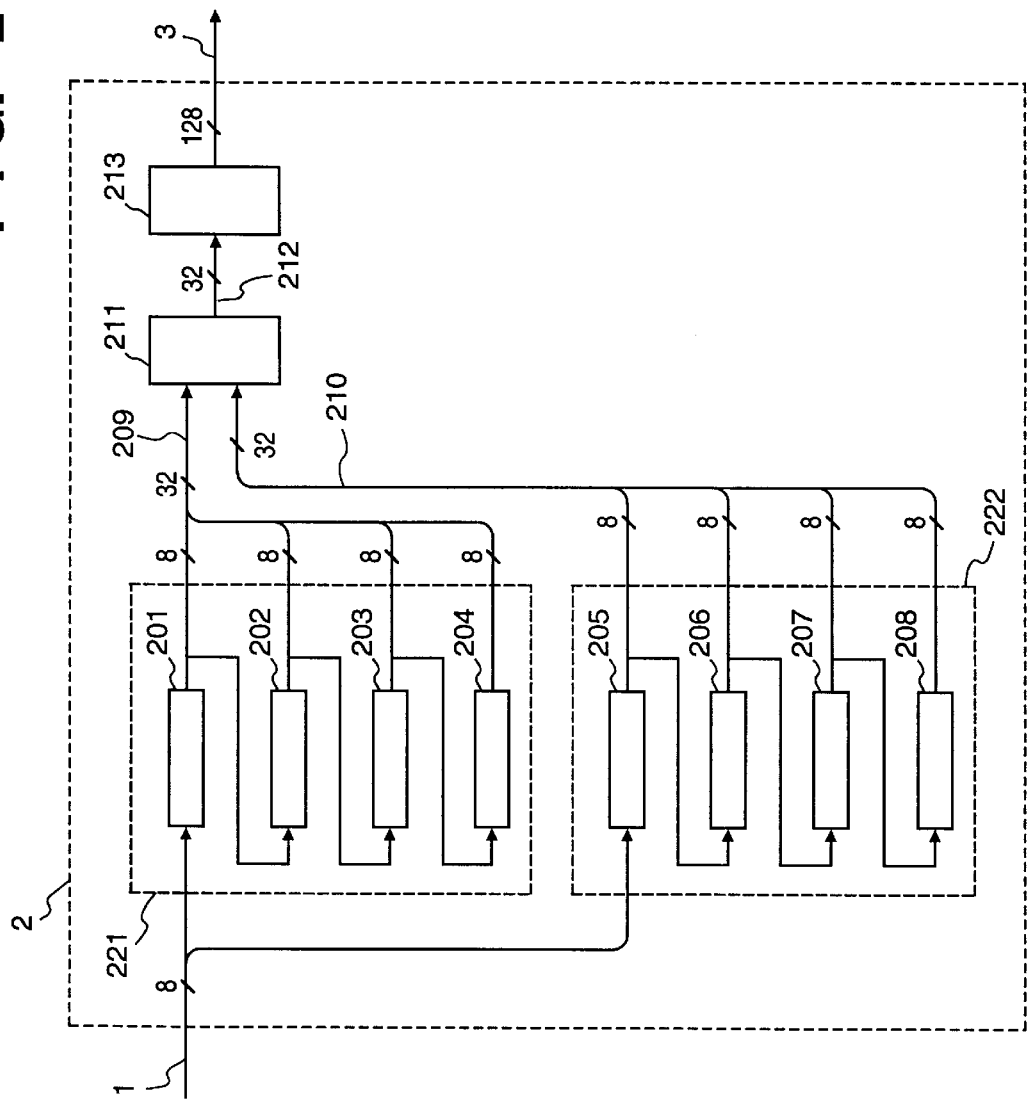
FIG. 2 is a block diagram showing the arrangement of a structure conversion unit.

FIG. 2 is a block diagram showing the internal structure of the structure conversion unit 2. As shown in FIG. 2, the structure conversion unit 2 converts input image data 1 consisting of 8 bits per pixel into output image data 3 consisting of 128 bits, thus decreasing the transfer rate to $\frac{1}{16}$ that of the input data.

This structure conversion unit 2 includes a buffer 221 constituted by line buffers 201, 202, 203, and 204 and designed to create image data corresponding to four lines which are delayed in units of lines, a buffer 222 constituted by line buffers 205, 206, 207, and 208 having the same arrangement as that of the line buffers 201, 202, 203, and 204 corresponding to four lines, a data selector 211, and a serial/parallel converter 213.

While one of the buffers 221 and 222 performs a 4-line delay operation at the same transfer rate as that of the input data 1, only an operation of simultaneously reading out 4-line data is performed, that is, 32-bit data shown by numerals 209 and 210, are read out from another buffer at a transfer rate ¼ that of the input data 1. These operations are alternately and consecutively performed. The data selector 211 switches the 32-bit data 209 and 210 every four lines to continuously perform a rate adaptation for decreasing the transfer rate to ¼.

The serial/parallel converter 213 further performs a transfer-rate converting operation of decreasing the transfer rate to ¼ by converting image data 212 (32-bit data), whose transfer rate is ¼ that of the input data 1, into 128-bit data.

With this operation, since the 8-bit input data 1 is converted into the 128-bit data 3, image data representing 4 (lines)×4 (pixels) can be treated as one data (one block) at a transfer rate ¹⁄₁₆ that of the input data 1.

In this case, by defining 4×4 image data as one access data, the transfer rate is decreased to ¹⁄₁₆, which is determined by the relationship between the transfer rate of an input image and a memory access time. That is, there is a case in which the transfer rate is decreased to ¼ by using 2×2 image data, while there is another case in which the transfer rate must be decreased to ¹⁄₆₄ by using 8×8 image data. In these cases as well, transfer-rate conversion can be realized by the same method as that described above.

When the structure conversion unit 2 decreases the transfer rate in this manner, a memory write/read cycle can be realized in the next stage, the image storage unit 4.

Figure 3:
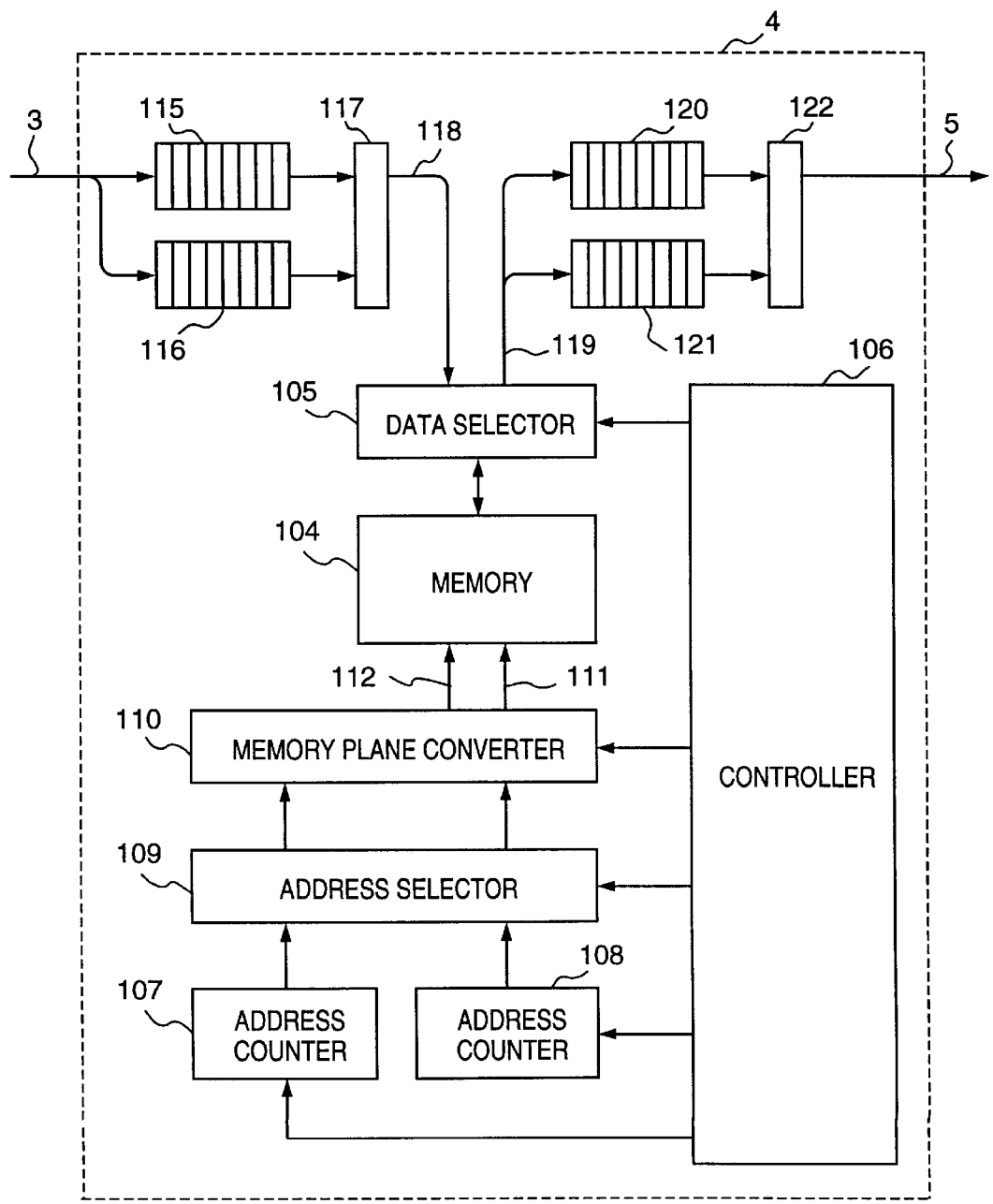
FIG. 3 is a block diagram showing the arrangement of an image storage unit.

FIG. 3 is a block diagram showing the internal arrangement of the image storage unit 4.

As shown in FIG. 3, the image storage unit 4 includes a memory 104 having a two-dimensional memory plane, address counters 107 and 108 of the memory 104, an address selector 109 for selecting predetermined bits of the address counters 107 and 108, a memory plane converter 110 for performing conversion of the memory plane, buffers 115 and 116 to which 128-bit data is input, a selector 117 for selecting outputs from the buffers 115 and 116, a data selector 105 for switching data write and read operations with respect to the memory 104, buffers 120 and 121 for temporarily storing data read out from the memory 104, a selector 122 for selecting outputs from the buffers 120 and 121, and a controller 106 for controlling the data selector 105, the memory plane converter 110, the address selector 109, and the address counters 107 and 108.

The controller 106 controls the address selector 109 such that one of the counter values of the address counters 107 and 108 becomes an address to the memory 104 in the horizontal direction, and the other counter value becomes an address in the vertical direction.

The controller 106 can arbitrarily load initial values to the address counters 107 and 108 and select count-up and count-down modes independently for each of the address counters. The data selector 105 accesses the memory 104 to write image data 118 and read out image data 119 under the control of the controller 106.

The memory plane converter 110 converts the address information of an image plane into memory address information. In this conversion processing, address bits are exchanged to allocate an image area having a two-dimensional space to a memory area corresponding to one row which is one of the columns and rows constituting a memory plane.

Figure 4:
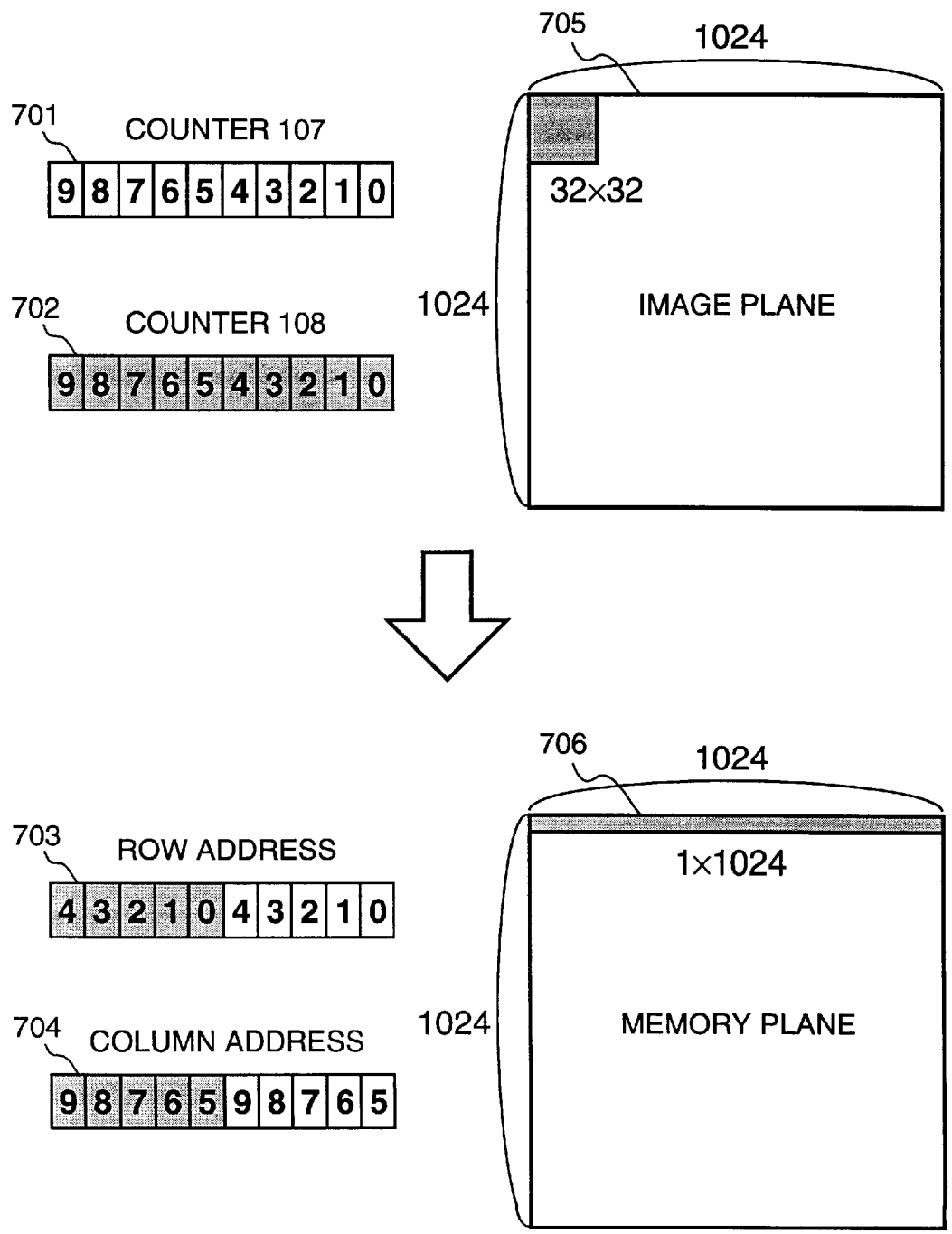
FIG. 4 is a view for explaining conversion of a memory plane.

FIG. 4 is a view for explaining details of the above conversion processing. Referring to FIG. 4, reference numerals 701 and 702 denote counter bit strings of the address counters 107 and 108; and 703 and 704, row and column address bit strings after conversion. The conversion processing is performed as follows.

Bits 0 to 4 of the counter 107 are replaced with bits 0 to 4 of the row address 703, and bits 0 to 4 of the counter 108 are replaced with bits 5 to 9 of the row address 703. In addition, bits 5 to 9 of the counter 107 are replaced with bits 0 to 4 of the column address 704, and bits 5 to 9 of the counter 108 are replaced with bits 5 to 9 of the column address 704.

Assume that one pixel consists of eight bits, and 4 (lines)×4 (pixels) image data is defined as one block. In this case, with this replacement processing, 32×32 data in an image plane 705 is allocated to a 1,024×1 area as one-row storage area of a memory plane 706, as indicated by the right-side planes in FIG. 4. That is, image data input in units of lines are stored in the memory plane such that 32×32 blocks constitute one row (1,024×1). In this case, since one data of the image data of the image plane 705 corresponds to ¹⁄₁₆ a pixel, image data corresponding to a maximum of 4,096×4,096 pixels can be stored. If, for example, a 4-bit, 1,024×1,024 plane of a 4-megabyte DRAM is used, 128-bit data is stored in one access cycle. In order to form this memory plane, therefore, 32 DRAMs are simultaneously operated. If a larger image size is required, a plurality of such memory planes are prepared, and bank switching is performed. With this arrangement, the requirement can be easily satisfied.

Referring to FIG. 4, 32×32 image data are replaced to be written as one-row data in the memory plane. This replacement is restricted by the number of bits constituting one row. In this case, since the number of bits constituting one row is 1,024, its divisor, 32, is used as a standard unit.

Figure 5:
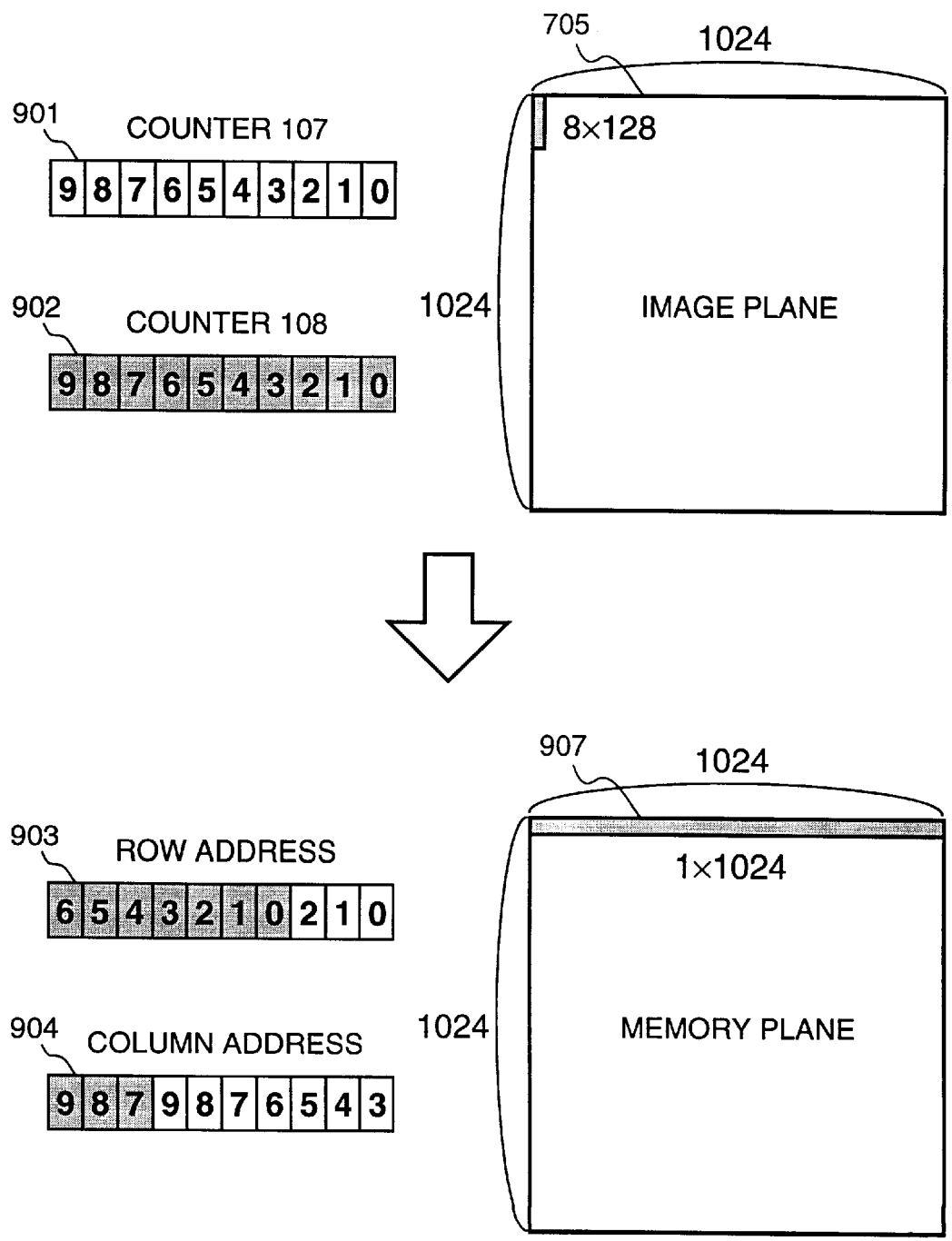
FIG. 5 is a view for explaining another example of conversion of the memory plane.

FIG. 5 shows a case wherein an 8×128 image plane is used. In this case as well, row and column addresses 903 and 904, respectively, can be converted by the same method as shown in FIG. 4. That is, bits 0 to 2 of the counter 107 are replaced with bits 0 to 2 of the row address 903, and bits 0 to 6 of the counter 108 are replaced with bits 3 to 9 of the row addresses 903. At the same time, 3 to 9 of the counter 107 are replaced with bits 0 to 6 of the column address 904, and bits 7 to 9 of the counter 108 are replaced with bits 7 to 9 of the column address 904.

The number of bits constituting a memory plane varies depending on a memory device to be used. When, for example, an 8-bit, 16-megabyte DRAM is used, a 2,048×1, 024 memory plane may be set. Basically, however, address conversion can be performed with a divisor of the number of bits constituting a row as a unit, as described above.

This memory plane conversion is restricted by allowable access time and hardware size of the memory in addition to the number of row bits of the memory. In this embodiment, these restrictions are overcome by the buffers 115, 116, 120, and 121.

As shown in FIG. 3, the image data 3 input to the image storage unit 4 are input to the buffers 115 and 116 which perform latching of data in units of eight data. These buffers 115 and 116 constitute a double-buffer unit. Eight data are alternately written in the buffers 115 and 116 constituting the double-buffer unit. While data are being written in one of these buffers, data are read out from the other buffer at a timing different from the write timing. The data which have been read out are selected by the selector 117.

Figure 6:
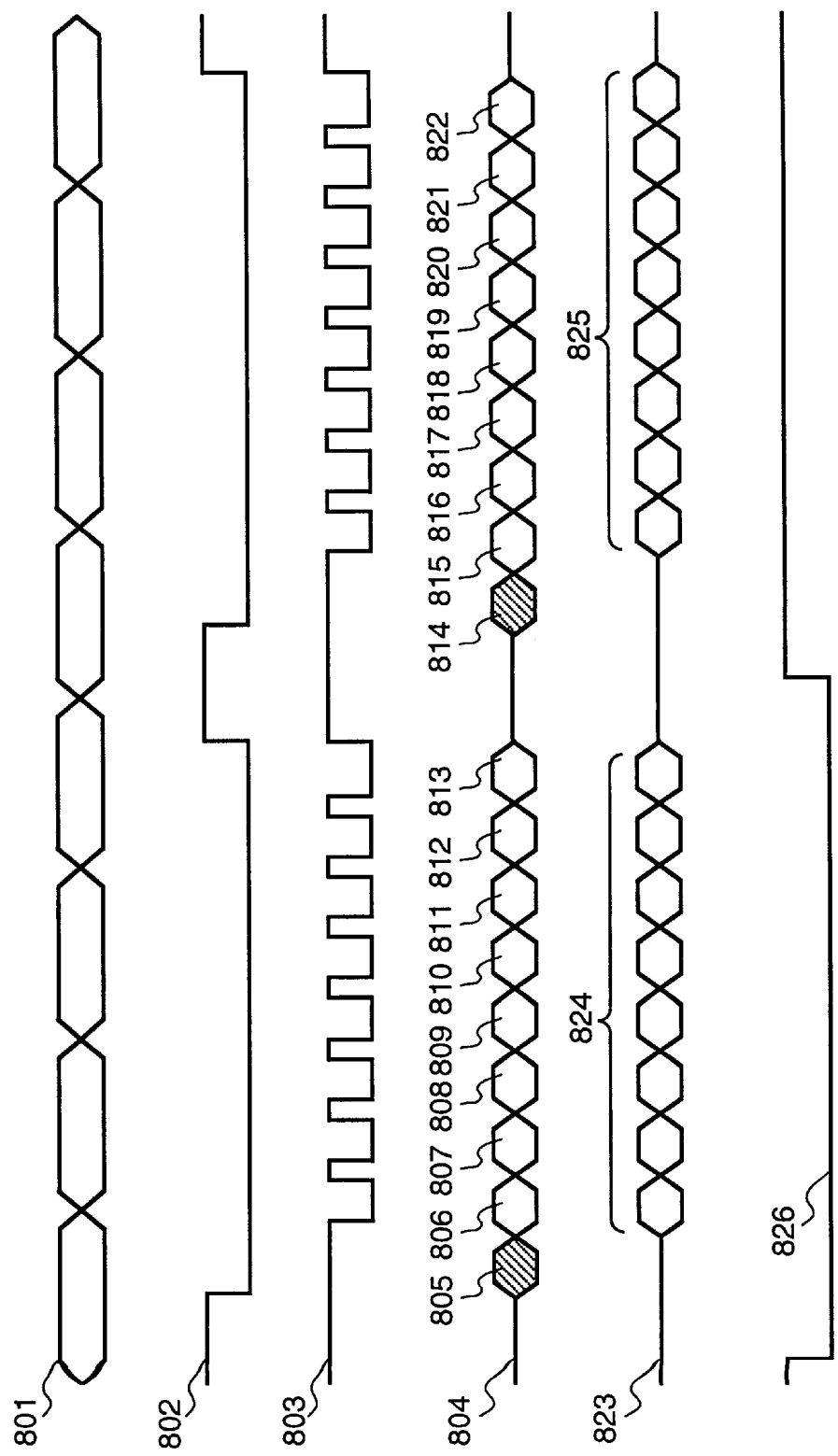
FIG. 6 is a timing chart for explaining the write and read timings of data.

The data selector 105 selects the mode in which data are written in the memory plane, and writes the data selected by the selector 117 in the memory 104. Write/read timing will be described with reference to FIG. 6. The timing chart of FIG. 6 indicates a case wherein a time-division operation is performed to simultaneously and continuously write/read image data in/from the memory. More specifically, the image data 3 input to the image storage unit 4 are continuously transferred at the transfer timing denoted by reference numeral 801. In this case, for example, the data are written in the buffer 115 at the timing shown in FIG. 6. Meanwhile, eight data written in advance are read out from the buffer 116. This read timing corresponds to eight data 824 of memory access data 823. A memory access address 804 is supplied to the memory 104 in accordance with the data 823. Reference numeral 805 denotes a column address in the memory 104 to which write access will be made. Addresses 806 to 813 are row addresses. Since one row of the memory plane is allocated to a 32×32 image plane, access must be made with a divisor of 32 as a unit. In this case, the access is made in units of eight data.

Read access is made in the same manner as described above. More specifically, reference numeral 814 denotes a column address in the memory 104 to which read-access will be made. Addresses 815 to 822 are row addresses. Eight data 825 are the image data 119 read out from the memory 104. The data selector 105 is switched at the timing denoted by reference numeral 826. The image data 119 read out from the memory 104 is further converted by the buffers 120 and 121 into data corresponding to the external access timing denoted by reference numeral 801.

Figure 7:
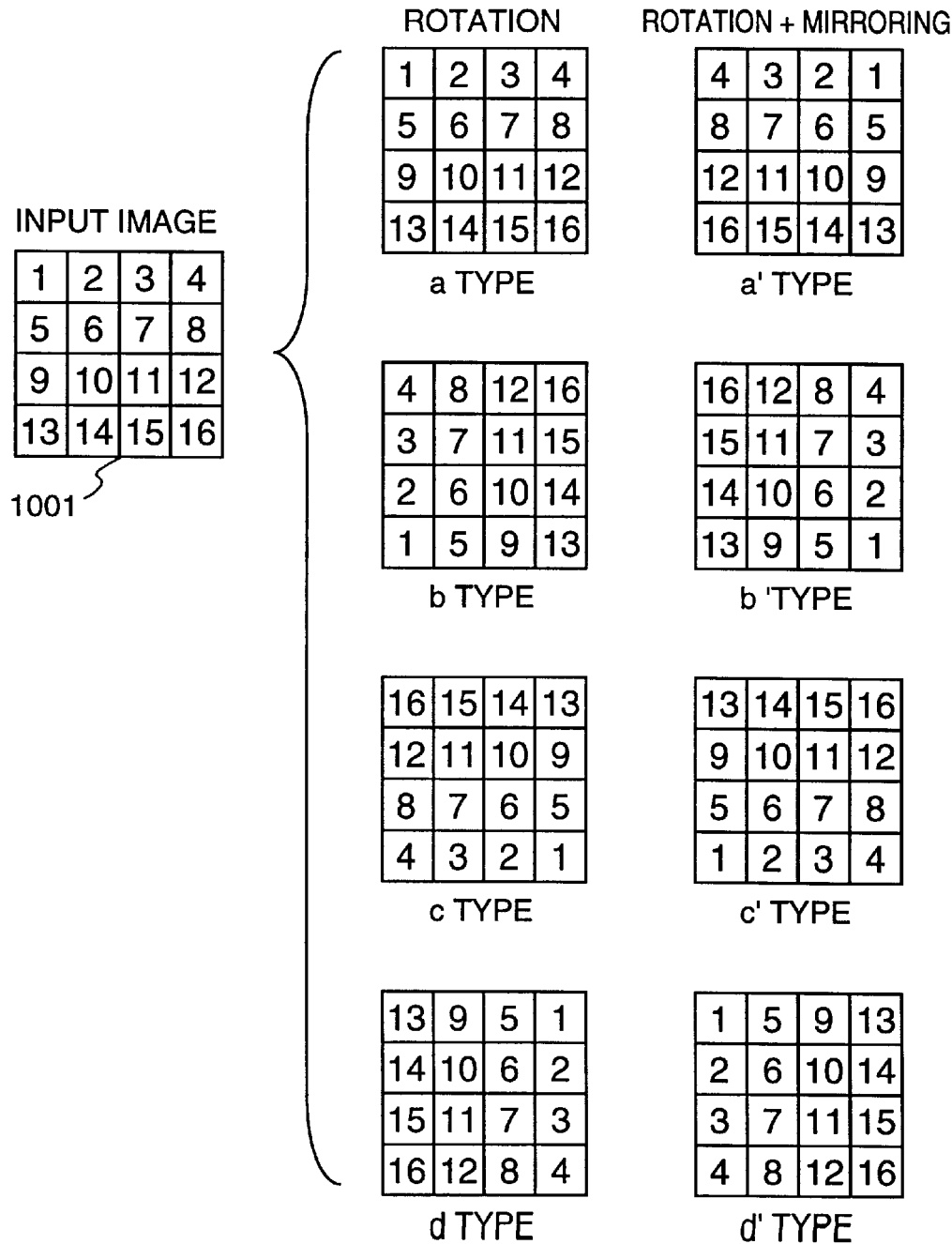
FIG. 7 is a view for explaining rotation processing and (rotation+mirroring) processing.
Figure 8:
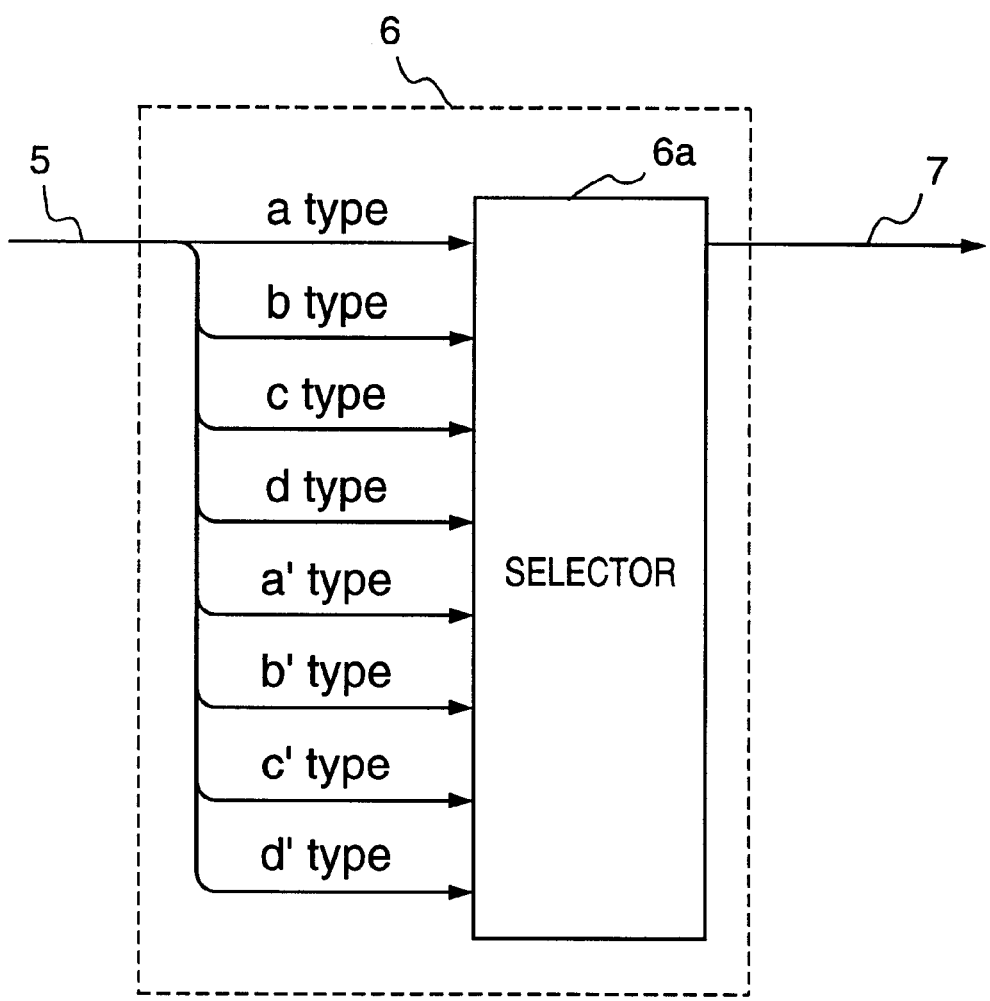
FIG. 8 is a block diagram showing the arrangement of a layout conversion unit.

As shown in FIG. 8, the layout conversion unit 6 which performs rotation processing/mirroring, is constituted by only a selector 6a for selecting one of eight types of input image data whose data bits have been arranged in advance in prescribed order. The layout conversion unit 6 performs the rotation processing/mirroring on a 4×4 square image by changing pieces of position information 1 to 16 (denoted by reference numeral 1001 in FIG. 7) of each bit constituting 128-bit image data 5 read out from the image storage unit 4, as shown in FIG. 7.

It should be noted that, with this processing, the rotating direction of an image or whether or not to perform the mirroring can be arbitrarily set at the time when a data read operation is performed. However, the layout conversion unit 6 may be arranged on the input side of the image storage unit 4.

Figure 9:
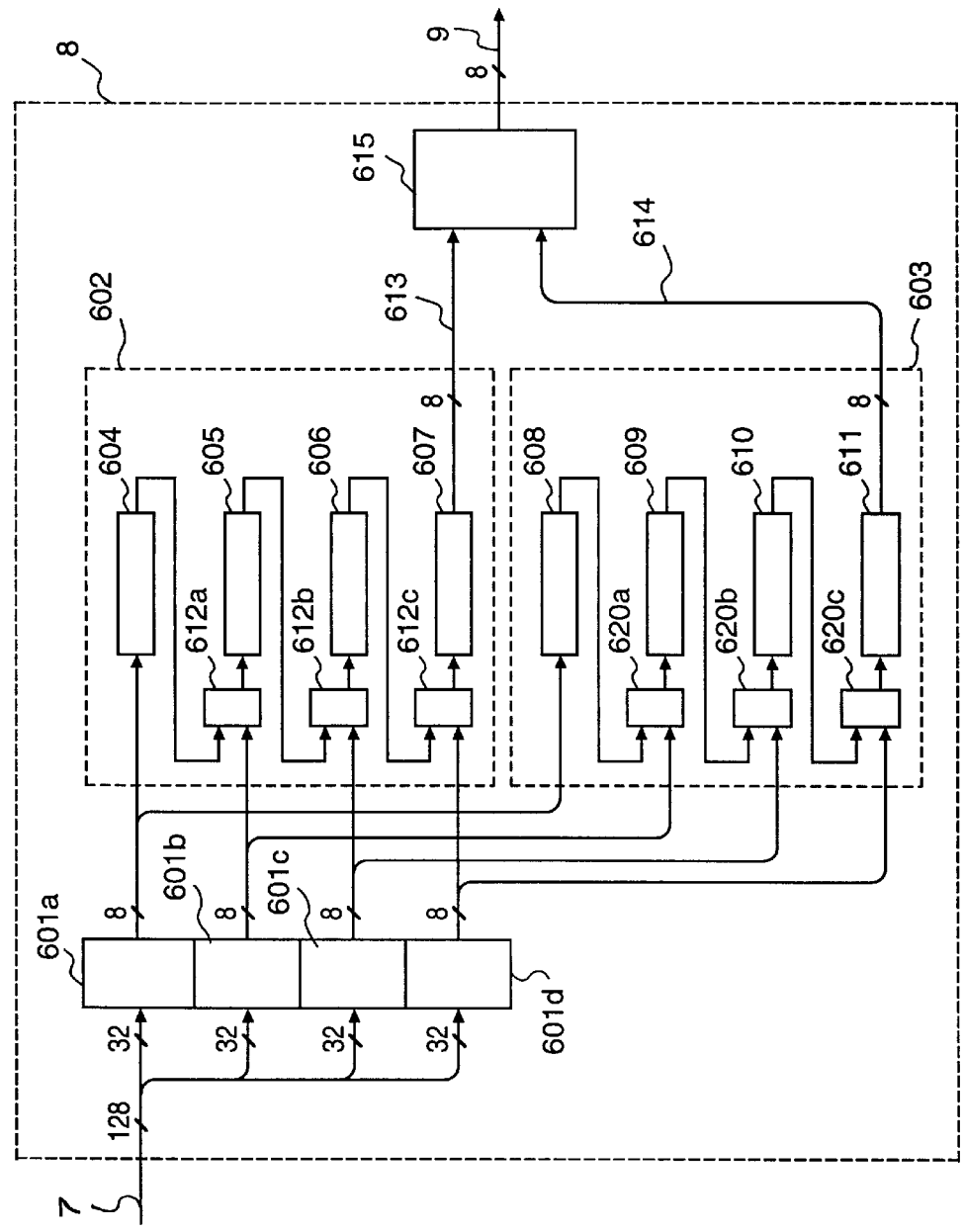
FIG. 9 is a block diagram showing the arrangement of an inverse structure conversion unit.

The inverse structure conversion unit 8 for converting an image transfer structure again into a 4×4 two-dimensional structure will be described with reference to FIG. 9. The inverse structure conversion unit 8 includes four serial/parallel converters 601a to 601d, a buffer 602 constituted by line buffers 604 to 607 and selectors 612a to 612c, a buffer 603 having the same arrangement as that of the buffer 602, and a selector 615.

128-bit image data 7 input to the unit 8 is converted from a signal form of 32×4 to a signal form of 8×4, by the four serial/parallel converters 601a to 601d. With this conversion, the transfer rate of the image data becomes four times higher than that of the input data 7. The transfer rate of this data is further increased to a rate four times higher than the previous one, by the buffers 602 and 603. As a result, the transfer rate of the data becomes equal to that of the image data 1. The image data output from the serial/parallel converters 601a to 601d are respectively written in the line buffers 604 to 607. After data representing 4 lines data are written, a switching operation is performed by the selectors 612a to 612d such that an output from the line buffer 606 is input to the line buffer 607, an output from the line buffer 605 is input to the line buffer 606, and an output from the line buffer 604 is input to the line buffer 605.

At the same time, data is read out from the line buffer 607 at a rate four times higher than the write rate. Meanwhile, data are written in the four line buffers, line buffers 608 to 611 of the buffer 603. This operation is alternately performed with respect to the buffers 602 and 603 by switching done by the selector 615, thereby continuously performing conversion which is inverse to that performed by the structure conversion unit 2.

By repeatedly performing the above processings, it is capable of storing the whole input data in the form of 1024×1 in 32×32-block unit, and reading out the data by accessing in the row direction. It should be noted that, with respect to an access between columns (in the following 32×32 blocks), the access should be done in the column direction.

Rotation processing/mirroring of 4×4 block data has been described above with reference to FIGS. 7 and 8. Described below is rotation processing/mirroring of entire image data.

The image storage unit 4 incorporates two counters, the counters 107 and 108. The count values of these counters correspond to the horizontal and vertical addresses of image data. As described above, a control signal from the controller 106 is used to select which counter is a horizontal address counter, and which counter is an up- or down-counter. With this operation, 90°-, 180°-, or 270°-rotation processing of image data, and its mirroring in the horizontal or vertical direction are performed.

More specifically, the rotation processing/mirroring is performed by selecting counters and the like in accordance with the address control table shown in FIG. 10. In FIG. 10, a horizontal address counter is represented by H; a vertical address counter, V; an up-counter, U, and a down-counter, D. In addition, position conversion within each block which is performed by the layout conversion unit 6 is described as block type in FIG. 10 corresponding to the types shown in FIG. 7.

Address control for 90°-rotation processing will be described with reference to FIG. 4. When paying attention to an upper right portion of image data which serves as a start point in a read operation, the relationship between image addresses and memory addresses are as follows.

Memory Write Address:

| Image Address (H,V) | | Memory Address (row,column) |
|---|---|---|
| 000,000 | → | 000,000 |
| 001,000 | → | 001,000 |
| 002,000 | → | 002,000 |
| ... | → | ... |
| 01E,000 | → | 01E,000 |
| 01F,000 | → | 01F,000 |
| 020,000 | → | 000,001 |
| ... | → | ... |
| 3FC,000 | → | 01C,01F |
| 3FD,000 | → | 01D,01F |
| 3FE,000 | → | 01E,01F |
| 3FF,000 | → | 01F,01F |
| ... | → | ... |
| 3FC,001 | → | 03C,01F |
| 3FD,001 | → | 03D,01F |
| 3FE,001 | → | 03E,01F |
| 3FF,001 | → | 03F,01F |
| 3FC,002 | → | 05C,01F |
| 3FD,002 | → | 05D,01F |

-continued

| Image Address (H,V) | | Memory Address (row,column) |
|---|---|---|
| 3FE,002 | → | 05E,01F |
| 3FF,002 | → | 05F,01F |
| ... | → | ... |

Memory Read Address (conforming to 90°-rotation processing based on the above address control table)

| Image Address (H,V) | | Memory Address (row,column) |
|---|---|---|
| 000,3FF | → | 3E0,3E0 |
| 000,3FE | → | 3C0,3E0 |
| 000,3FD | → | 3A0,3E0 |
| 000,3FC | → | 380,3E0 |
| ... | → | ... |
| 001,3FF | → | 3E1,3E0 |
| 001,3FE | → | 3C1,3E0 |
| 001,3FD | → | 3A1,3E0 |
| ... | → | ... |
| 002,3FF | → | 3E2,3E0 |
| 002,3FE | → | 3C2,3E0 |
| 002,3FD | → | 3A2,3E0 |
| ... | → | ... |

The image rotation processing is performed by controlling addresses in this manner. In other words, by performing memory access with a divisor of 32 as a unit, i.e., in units of eight data with respect to the above-mentioned memory control, consecutive access is always carried out only in the row direction of the memory. Even in performing consecutive access in the V direction (in relation with a direction of inputting the image) in the process of image rotation, a high-speed access mode can be used only in the row direction of the memory in the 32×32 blocks.

As described above, address conversion is performed such that for example, 32×32 blocks of image data in the image plane 705 of FIG. 4 are to be stored in a one-row storage area (1,024×1) of the memory plane 706 to which high-speed access can be made. The high-speed access can therefore be made to image data in the image plane 705 from any direction, i.e., the horizontal direction or the vertical direction. In other words, rotation processing, mirroring processing and the like are performed by the layout conversion unit 6 on each block (4×4) of 32×32 (1024×1) blocks stored in the image storage unit 4 and the stored data are read out in 32×32-block unit in the row direction. These processing are repeated, thereby performing the rotation processing and mirroring of image data at a high speed.

In this embodiment, a start point in a write operation is (000,000) and that in a red operation is (000,3FF) as described above, when performing 90°-rotation processing. In the same manner, 90°-rotation of image can be performed by setting a start point in a write operation to (000,3FF) and that in a read operation to (000,000). Images processed in this manner are visually displayed by an output device such as a printer, a display or the like.

The present invention can be applied to a system constituted by a plurality of devices (e.g., host computer, interface, reader, printer) or to an apparatus comprising a single device (e.g., copy machine, facsimile).

What is claimed is:

1. An image processing apparatus for processing image data representing an image which extends two-dimensionally, comprising:

input means for inputting image data constituted by a plurality of columns and rows as input image data;

setting means for setting an address so as to store image data of a predetermined unit block which is a rectangular area extracted from the input image data and consisting of a plurality of columns and rows, as one-row image data in a storage means;

storing means for storing as the one-row image data, the image data of the predetermined unit block in a one-row storage area of the storage means designated by the address set by said setting means;

output means for outputting the image data stored by said storing means in a form selected from a plurality of output forms; and holding means for holding a plurality of address patterns corresponding to each of the output forms, wherein said output means outputs the image data in accordance with one of the address patterns held by said holding means which is made to correspond to the selected output form.

2. The apparatus according to claim 1, wherein the image data of the predetermined unit block is data in the form of m rows×n columns (where m and n are integers), and the one-row image data is data in the form of 1 row×m·n columns.

3. The apparatus according to claim 1, wherein predetermined image processing of the image data corresponding to the unit block is performed by reading out the image data from the one-row storage area of the storage means in a row direction therein.

4. The apparatus according to claim 3, wherein the predetermined image processing includes rotation processing of the image data, mirroring of an image, and a combination of the rotation processing and the mirroring.

5. The apparatus according to claim 1, wherein predetermined image processing is performed on the entire input image data by reading out image data of predetermined unit block from the storage means in row and column directions.

6. The apparatus according to claim 5, wherein the predetermined image processing includes rotation processing of the entire image data, mirroring of an image, and a combination of the rotation processing and the mirroring.

7. The apparatus according to claim 1, wherein the image data is transferred to said storage means by a raster scheme.

8. The apparatus according to claim 1, wherein a row direction with respect to the storage means is a direction in which high-speed access can be made to the storage means.

9. The apparatus according to claim 1, wherein image data is written in and read out from the storage means in a unit indicative of a devisor of the number of pixels constituting one row of the storage means.

10. An image processing method of processing image data representing an image which extends two-dimensionally, comprising:

an input step of inputting image data constituted by a plurality of rows as input image data;

a setting step of setting an address so as to store image data of a predetermined unit block which is a rectangular area extracted from the input image data and consisting of a plurality of columns and rows, as one-row image data in a storage means;

a storing step of storing as the one-row image data, the image data of the predetermined block in a one-row storage area of the storage means designated by the address set in said setting step;

an output step of outputting the image data stored at said storing step in a form selected from a plurality of output forms; and a holding step of holding a plurality of address patterns corresponding to each of the output forms, wherein, in the output step, the image data are output in accordance with one of the address patterns held in said holding step which is made to correspond to the selected output form.

11. The method according to claim 10, wherein the image data of the predetermined unit block is data in the form of m rows×n columns (where m and n are integers), and the one-row image data is data in the form of 1 row×m·n columns.

12. The method according to claim 10, further comprising the step of performing predetermined image processing of the image data corresponding to the unit block by reading out the image data from the one-row storage area of the storage means in a row direction therein.

13. The method according to claim 12, wherein the predetermined image processing includes rotation processing of the image data, mirroring of an image, and a combination of the rotation processing and the mirroring.

14. The method according to claim 10, further comprising the step of performing predetermined image processing on the entire input image data by reading out image data of predetermined unit block from the storage means in row and column directions.

15. The method according to claim 14, wherein the predetermined image processing includes rotation processing of the entire image data, mirroring of an image, and a combination of the rotation processing and the mirroring.

16. The method according to claim 10, wherein the image data is transferred to said storage means by a raster scheme.

17. The method according to claim 10, wherein a row direction with respect to the storage means is a direction in which high-speed access can be made to the storage means.

18. The method according to claim 10, wherein image data is written in and read out from the storage means in a unit indicative of a devisor of the number of pixels constituting one row of the storage means.

19. A An image processing apparatus comprising:

input means for inputting image data constituted by a plurality of columns and rows;

storing means for storing each of the plurality of rows constituting the image data input by said input means into a one-row storage area of a storage medium;

reading means for reading out image data stored by said storing means from the storage medium;

output means for outputting the image data read out of the storage medium by said reading means in a form selected from a plurality of output forms representing two-dimensional images; and holding means for holding a plurality of address patterns corresponding to each of the output forms, wherein said reading means changes access to the storage medium in accordance with one of the address patterns held by said holding means which is made to correspond to the selected form.

20. The apparatus according to claim 19, wherein said output means outputs image data representing a rotated version of an image represented by the image data input by said input means.

21. The apparatus according to claim 19, wherein said output means outputs image data representing an mirroring version of an image represented by the image data input by said input means.

22. The apparatus according to claim 19, wherein said input means inputs image data in the form of m rows by n columns, and said storing means stores the image data in the storage medium in the form of 1 row by m×n columns.

23. The apparatus according to claim 19, wherein said reading means accesses the storage medium at a higher speed in a row direction than in a column direction.

24. An image processing method comprising the steps of:

inputting image data constituted by a plurality of columns and rows;

storing each of the plurality of rows of the image data input in said input step into a one-row storage area of a storage medium;

reading out image data stored by said storing step from the storage medium;

outputting the image data read out of the storage medium in said reading step in a form selected from a plurality of output forms representing two-dimensional images;

holding a plurality of address patterns corresponding to each of the output forms, wherein, in said reading step, access to the storage medium is changed in accordance with one of the address patterns held at said holding step which is made to correspond to the output form utilized in said output step.

25. The method according to claim 24, wherein, in said output step, image data representing a rotated version of an image represented by the image data input in said input step is output.

26. The method according to claim 24, wherein in said output step, image data representing an mirroring version of an image represented by said image data input in said input step is output.

27. The method according to claim 24, wherein, image data in the form of m rows by n columns are input in said input step, and the image data in the form of 1 row by m×n columns are stored in the storage medium in said storing step.

28. The method according to claim 24, wherein, in said reading step, the storage medium is accessed at a higher speed in a row direction than in a column direction.

* * * * *

UNITED STATES PATENT AND TRADEMARK OFFICE
CERTIFICATE OF CORRECTION

PATENT NO. : 6,031,546
DATED : February 29, 2000
INVENTOR(S) : HIDEAKI SHIMIZU Page 1 of 2

It is certified that error appears in the above-identified patent and that said Letters Patent is hereby corrected as shown below:

In the Drawing:

SHEET 10

Figure 10, "COOUNTER" should read --COUNTER--.

COLUMN 1

Line 24, "devised-for" should read --devised for--;
Line 65, "mean," should read --means--.

COLUMN 4

Line 47, "1," should be deleted;
Line 48, "024" should read --1,024--.

COLUMN 5

Line 66, "data" should read --of data--.

COLUMN 6

Table 1,  "3FC,001 → 03C,01F
3FD,001 → 03D,01F
3FE,001 → 03F,01F
3FF,001 → 035,01F
3FC,002 → 05C,01F
3FD,002 → 05D,01F"

should read

--3FC,001 → 03C,01F
3FD,001 → 03D,015
3FE,001 → 03E,01F
3FF,001 → 03F,01F
... → ...
3FC,002 → 05C,01F
3FD,002 → 05D,01F--.

UNITED STATES PATENT AND TRADEMARK OFFICE
CERTIFICATE OF CORRECTION

PATENT NO. : 6,031,546
DATED : February 29, 2000
INVENTOR(S) : HIDEAKI SHIMIZU It is certified that error appears in the above-identified patent and that said Letters Patent is hereby corrected as shown below:

<u>COLUMN 7</u>

Line 10, "table)" should read --table):--;
    Line 45, "(1024x1)" should read --(1,024x1)--;
    Line 48, "ing" should read --ings--.

<u>COLUMN 9</u>

Line 39, "A An" should read --An--.

<u>COLUMN 10</u>

Line 8, "an" should read --a--;
    Line 43, "an" should read --a--;
    Line 46, "wherein," should read --wherein--.

Signed and Sealed this

Seventeenth Day of April, 2001

NICHOLAS P. GODICI

*Attest:*

*Attesting Officer*    *Acting Director of the United States Patent and Trademark Office*